Figure 1:
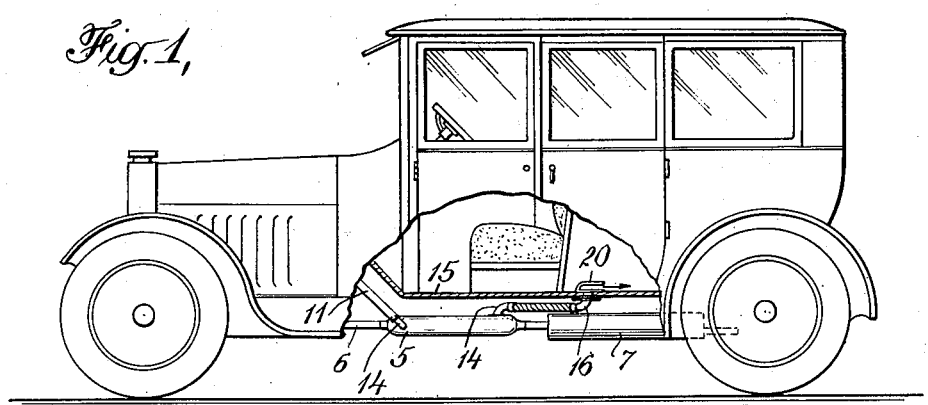

Oct. 29, 1929.  S. A. SNELL  1,733,759
AUTOMOBILE HEATER
Filed Aug. 10, 1926

INVENTOR
Samuel A. Snell
BY
ATTORNEYS.

Patented Oct. 29, 1929

1,733,759

UNITED STATES PATENT OFFICE

SAMUEL A. SNELL, OF DETROIT, MICHIGAN, ASSIGNOR TO FREDERICK C. MATTHAEI, OF DETROIT, MICHIGAN

AUTOMOBILE HEATER

Application filed August 10, 1926. Serial No. 128,377.

This invention relates to heaters for use on closed body automobiles and it has reference more particularly to devices whereby the heated air is conveyed from the heater to the interior of the body of the car. The heater is preferably of the type in which the hot exhaust gases from the engine are caused to exchange heat with a current of air passing through the heater and may be of any suitable construction, though that which I prefer to employ is the construction illustrated and described in my application for patent, Serial No. 93,845, filed March 11, 1926.

One of the features of the invention involves the provision of an outlet for the heated air within the car body located upon the floor of the body and arranged to direct the air in a thin horizontally extended sheet over the floor of the car body. By such discharge of the heated air, the interior of the car is more effectively and more uniformly heated, particularly in that the full benefit of the heated air is obtained with the windows of the car more or less open for ventilation. Preferably the conduit conveying the heated air from the heater is led up to an opening in the floor of the car body and within the body is an outlet member mounted upon the floor over this hole and provided with a horizontally extended hood which directs the stream of heated air flowing upwardly through the hole in the floor outwardly horizontally over the floor of the body in a wide thin sheet.

This outlet member may be a box-like structure open along its edge and having a hole in the bottom with a flange around this hole, the flange being adapted to fit into the hole in the floor of the car to locate the outlet member and hold it in position, and the top wall of the outlet member constituting the hood above referred to, which directs the current of air outwardly horizontally in a wide thin sheet. The outlet member may be held in position by engagement of the flange referred to with the wall of the opening in the floor; this is particularly desirable because it permits of removal of the outlet member during the summer months, the hole in the floor being then closed by a neat and closely fitting plug.

Another of the features of the invention involves the provision of readily adjustable devices whereby the heater is adapted for installation upon a wide variety of different makes and types of cars. In constructing a heater for application by service stations to all makes and types of cars, it is found that a wide variety of conditions are presented. This variation in installation conditions depends on the side of the car on which the exhaust pipe and muffler are mounted, the position on the car body in which the hot air pipe is to be connected, the connection of the exhaust pipe to the front or rear end of the engine, the side of the engine on which the air pipe lies, and, of course, on variations in the designs of the cars and the spaces available for the heaters. In addition to these considerations, it is common to use flexible tubing in the air connection from the heater to the car body and the tubing adapted for this use is of limited flexibility.

I have found that a heater may be much more readily adapted for installation upon a wide variety of cars by the provision on the heater of inlet and outlet elbows for conveying the air to and from the heater, which elbows are mounted upon the heater in such a manner as to permit of turning them to any one of a wide range of different angular positions. With the heater so constructed it may be mounted upon the car in the appropriate position and then each of the two elbows may be turned to that angular position which facilitates to the greatest extent the installation of the remaining connections. The end of each elbow may fit so snugly within the cooperating element upon the heater as to make rigid securing of the elbow unnecessary after it has been positioned properly, but if desired it may be secured rigidly in its adjusted position in any suitable manner as for instance by a simple cotter pin.

This and other features of the invention will be better understood by reference to the following description taken in connection with the accompanying drawing which illustrates one embodiment of the invention.

Figure 2:
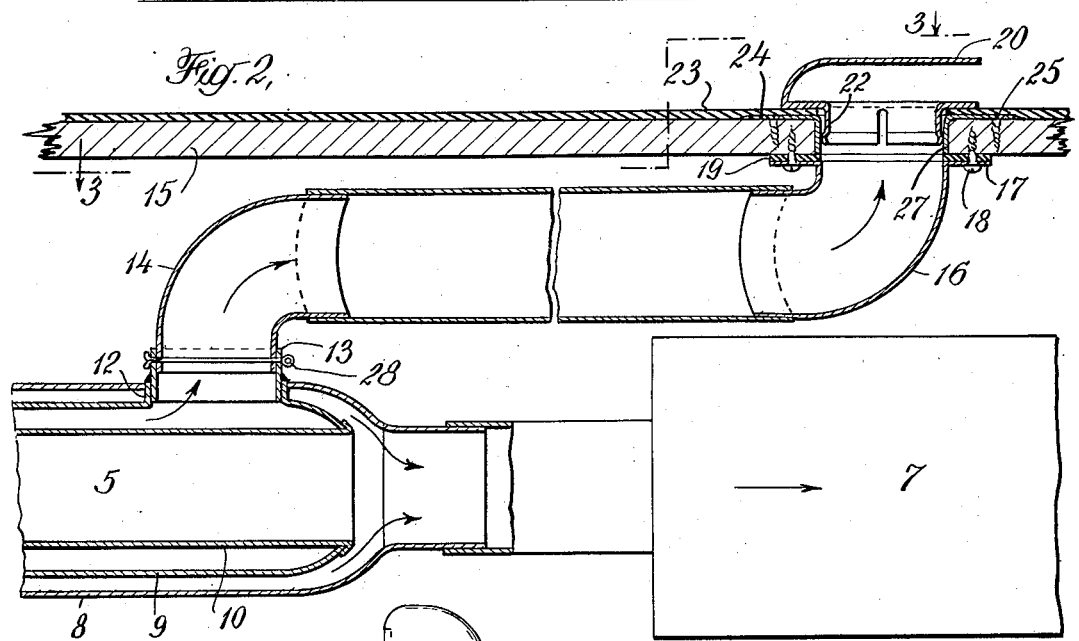
Figure 4:
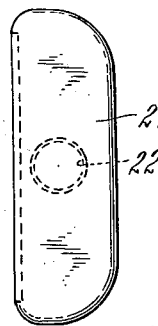
Figure 3:
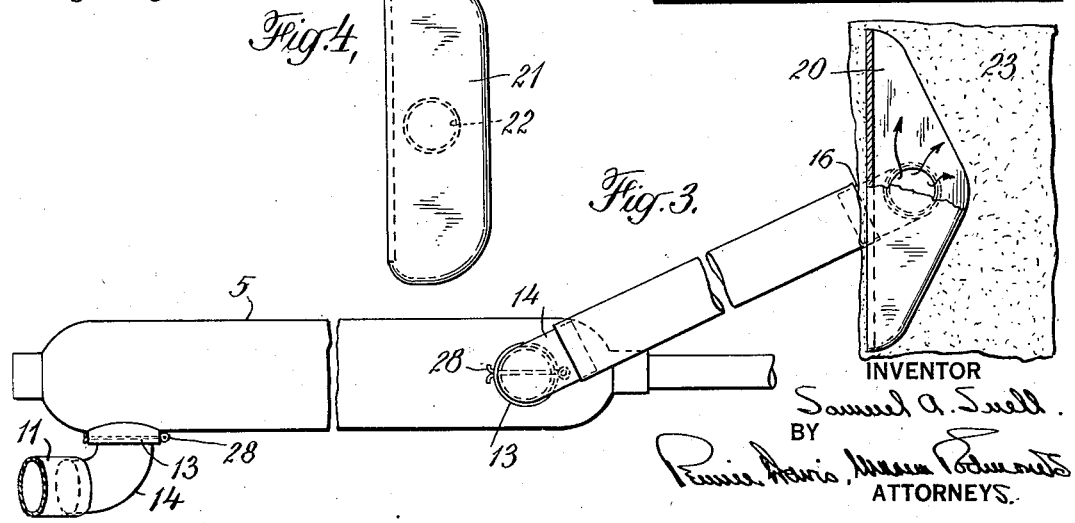

In the drawing, Fig. 1 is an elevation of a motor car broken away in part to show the heating devices; Fig. 2 is a detail view in vertical section; Fig. 3 is a plan view of the heating devices and Fig. 4 is a top view of an outlet member through which the heat flows into the car body.

Referring to these drawings, 5 is the heater connected at one end to the exhaust pipe 6 of the engine and having its other end connected to the muffler 7. The heater 5 may be of any of the constructions heretofore proposed for heating air from the exhaust gases but the construction which I prefer to employ is that indicated in Figs. 2 and 3. This heater includes a casing 8 within which is an air chamber formed by two concentric steel tubes 9 and 10 connected together at their ends as indicated so as to form a long annular chamber between them. At two points near its opposite ends, the middle of the outer tube 9 is drawn up to form an integral neck which is welded to the casing 8 and which constitutes an air passage. One of these necks is connected to the rear end of the air inlet pipe and the front end of this pipe extends up to a point in rear of the fan of the engine. The other of these necks constituting the air outlet is connected to the conduit leading to the interior of the car-body. The construction whereby these two air connections are effected is the same, so detailed description and illustration of one will suffice. The outlet for the heated air is shown in Fig. 2. Here the integral neck 12 on the tube 9 is shown as entering an opening in the casing 8 and soldered or welded thereto.

It is not possible or desirable to attempt to draw the metal of the tube 9 out to a neck of a length adequate for making connection to the conduit for the heated air, but it can readily be drawn out far enough to permit of securing the neck to the tubular member 9. I therefore place within the neck 12 a sleeve or cylinder 13 having the form of a short section of a piece of tubing. This piece 13 fits within the neck 12 tightly and may be secured to the neck by welding or otherwise. An elbow 14 has one end fitting within the end of the tubular piece 13 snugly enough to prevent any considerable leakage of heated air at this point but at the same time permit the elbow to be turned about the axis of the piece 13 to any desired angular position.

The end of this elbow 14 is connected to a suitable conduit extending beneath and substantially parallel to the floor of the car body, this conduit being in communication with a hole through the floor. In the drawing the floor is shown at 15 and the connecting conduit is shown at 16. This conduit may be of any suitable form and material; in many instances it will be desirable to use a flexible tubing made of a spirally wound metal strip.

On the end of this conduit, or on a piece secured to its end, is a circumferential flange 17, and by means of this flange the end of the conduit is secured to the under surface of the floor 15 in any suitable manner, as for instance by means of screws 18. It is desirable to insert a washer of non-metallic material 19 between the flange 17 and the floor 15 to prevent the transmission of noise to the interior of the car, though such a washer is not so essential if flexible tubing be employed for the conduit 16.

The outlet member is a box-like structure open along one edge and provided with a downwardly extending circular flange. In Fig. 3 this outlet member 20 is of triangular form and open along the two inclined edges, whereas in Fig. 4 the outlet member 21 is more nearly rectangular and open along one of its longer edges or along that longer edge and the two ends. In the bottom wall of the member 20 is a circular opening and about this opening is a downwardly extending flange 22. Near its lower end, this flange may be slotted to form fingers which are curved in the direction of their length as indicated in Fig. 2. In this figure the floor is shown as covered with a carpet 23 and a circular hole is provided in this carpet in alignment with the hole through the floor. A metal plate 24 is mounted by means of screws 25 upon the floor 15 under the carpet 23 and has a depending flange 27 entering the opening in the floor and the flange 22 on the outlet member engages this flange 27 frictionally to hold the outlet member in position. As shown in Fig. 2, the wall along the closed edge of the outlet member is curved so as to direct the stream of air flowing upwardly from the conduit, and the top wall of the outlet member forms a hood so that the current of air is directed outwardly horizontally over the floor of the car in a wide thin sheet as indicated by the arrows, Fig. 3.

The provision of an outlet member in a form suitable for directing the heated air into the car body in the form of a wide thin sheet flowing horizontally over the floor of the car, is of great importance for in this way superior ventilation of the interior of the car body may be secured. The heated air thus delivered into the car body passes through the whole of the interior of the body and produces substantially uniform temperature conditions at all points, whereas otherwise there would be a tendency for the air to flow in a more or less direct course to the outlets such as partially open windows. Furthermore, this form of heater does not detract from the appearance of the interior of the body and involves no element of inconvenience or obstruction. In addition, the construction herein illustrated and described is one which may be manufactured at low cost and installed upon a car readily and economically, and the convenience and economy of installation, notwithstanding variation in the conditions to be met, are greatly increased by the provision for angular adjustment of the elbows 14 about the axis of the outlet for heated air from the heater.

As stated above the construction employed at the forward end of the heater is similar to that described above and illustrated in Fig. 2 in that it includes an integral neck 12, sleeve 13, and elbow 14 having one end fitting snugly but adjustably within the sleeve 13, the other end of the elbow being connected to the rear end of the air pipe 11. If desired, the end of the elbow 14 may be permanently fastened to the sleeve 13 after the elbow has been turned to that angular position which is found to be best suited for meeting the conditions of the particular installation; for this purpose a cotter pin 28 is shown as passing through the sleeve and the end of the elbow to prevent them from becoming detached.

It will be noted also that the form of outlet member above described is one which permits of turning it to any desired angular position about the axis of the opening through the floor of the car so that the heated air may be directed where it is desired. Regulation of the air flow may be provided by means of suitable dampers but usually such regulation as is desired may be secured by opening the windows of the car more or less.

I claim:

1. In a closed motor car having an air heater beneath the floor thereof, the combination of a conduit leading from the air outlet of the heater to an opening through the floor of the car, one end of the conduit being secured to the floor adjacent said opening, and a distributor lying within the car body and receiving heated air from the conduit through said opening, the distributor being mounted in the opening out of contact with the conduit.

2. In a closed motor car having an air heater disposed beneath the floor thereof, the combination of a conduit leading from the outlet of the heater to an opening through the body, this conduit having elbows at its ends, one of which is adapted to be secured to the air outlet from the heater and the other secured to the under surface of the floor in registry with the said opening, and a distributor lying within the car body and receiving heated air from the conduit through the opening, this distributor having a neck disposed in the opening in contact with the walls thereof but out of contact with the adjacent elbow on the end of the conduit.

3. In a closed motor car having an air heater disposed beneath the floor thereof, the combination of a conduit having one end secured to the air outlet from the heater and the other end secured to the under surface of the car floor in registry with an opening therethrough, a pad of sound-insulating material interposed between the under surface of the floor and the end of the conduit, and a distributor lying within the car body and receiving heated air from the conduit through the opening, this distributor having a portion entering the opening and serving to secure the distributor in place, said portion being out of contact with the end of the conduit adjacent said opening.

4. In a closed motor car having an air heater disposed beneath the floor thereof, the combination of a conduit connected at one end to the air outlet from the heater and leading to an opening through the floor of the car body, the end of the conduit having a circumferential flange, means securing this flange to the under surface of the floor, and a distributor disposed within the car body and having a hollow portion entering and frictionally engaging the wall of the opening, heated air flowing from the conduit through the opening in said hollow portion to the distributor, the said portion being out of contact with the end of the distributor adjacent said opening.

In testimony whereof I affix my signature.

SAMUEL A. SNELL.